United States Patent [19]

Kawabata

[11] Patent Number: 5,092,625
[45] Date of Patent: Mar. 3, 1992

[54] FAIL DETECTING SYSTEM FOR ELECTROMAGNETIC ACTUATOR AND FAIL-SAFE SYSTEM FOR ACTIVE SUSPENSION SYSTEM INCORPORATING ELECTROMAGNETIC ACTUATOR

[75] Inventor: Kazunobu Kawabata, Kanagawa, Japan

[73] Assignee: Nissan Motor Company, Limited, Yokohama, Japan

[21] Appl. No.: 513,278

[22] Filed: Apr. 20, 1990

[30] Foreign Application Priority Data

Apr. 20, 1990 [JP] Japan .................................. 1-100825

[51] Int. Cl.$^5$ .......................................... B60G 17/015
[52] U.S. Cl. ................................. 280/707; 364/424.05; 371/25.1
[58] Field of Search .................. 371/25.1; 364/424.03, 364/424.05; 280/707

[56] References Cited

U.S. PATENT DOCUMENTS

| | | | |
|---|---|---|---|
| 4,702,490 | 10/1987 | Yamaguchi et al. | 280/707 |
| 4,801,155 | 1/1989 | Fukushima et al. | 280/707 |
| 4,848,790 | 7/1989 | Fukunaga et al. | 280/707 |
| 4,865,348 | 9/1989 | Hano et al. | 280/707 |
| 4,888,696 | 12/1989 | Akatsu et al. | 364/424.05 |
| 4,893,689 | 1/1990 | Laurich-Trost | 280/91 |
| 4,903,983 | 2/1990 | Fukushima et al. | 280/707 |
| 4,905,152 | 2/1990 | Kawabata | 364/424.05 |
| 4,909,534 | 3/1990 | Fukushima et al. | 280/707 |
| 4,911,468 | 3/1990 | Fukunaga | 280/707 |
| 4,911,469 | 3/1990 | Kawarasaki | 280/707 |
| 4,911,470 | 3/1990 | Fukunaga | 280/707 |
| 4,919,440 | 4/1990 | Tsukamoto | 280/707 |
| 4,938,499 | 7/1990 | Kawabata | 280/707 |
| 4,943,084 | 7/1990 | Fukunaga et al. | 280/707 |
| 4,948,165 | 8/1990 | Takahashi et al. | 280/707 |
| 4,961,595 | 10/1990 | Fukushima et al. | 280/772 |
| 4,967,360 | 10/1990 | Fukunaga et al. | 364/424.05 |
| 4,973,079 | 11/1990 | Tsukamoto | 280/707 |
| 4,982,979 | 1/1991 | Akatsu et al. | 280/707 |

FOREIGN PATENT DOCUMENTS

| | | |
|---|---|---|
| 0283004 | 9/1988 | European Pat. Off. . |
| 0284053 | 9/1988 | European Pat. Off. . |
| 0285153 | 10/1988 | European Pat. Off. . |

OTHER PUBLICATIONS

"Hydraulic and Pneumatic Manual", Ohm Company, 1975, pp. 532-547.

Primary Examiner—Charles A. Marmor
Assistant Examiner—Karin Tyson
Attorney, Agent, or Firm—Foley & Lardner

[57] ABSTRACT

A fail detecting system for an electromagnetic actuator avoids influence of a dither signal in detection of a failure of the electromagnetic actuator. Avoidance of influence of the dither signal is achieved by performing a comparison of a suspension control command with a driver current applied to the electromagnetic actuator in absence of the dither signal. An error value between the suspension control command and the driver current obtained through the comparison is compared with a predetermined fault detecting criterion for judging a failure of the electromagnetic actuator when the error value is greater than the fault detecting criterion.

5 Claims, 7 Drawing Sheets

FAIL DETECTING SYSTEM FOR ELECTROMAGNETIC ACTUATOR AND FAIL-SAFE SYSTEM FOR ACTIVE SUSPENSION SYSTEM INCORPORATING ELECTROMAGNETIC ACTUATOR

BACKGROUND OF THE INVENTION

1. Field of the Invention

The present invention relates generally to an active suspension system for an automotive vehicle. More specifically, the invention relates to a fail detection system for detecting failure of an electromagnetic actuator employed in the active suspension system and fail-safe operation to be performed in response to failure of the actuator.

2. Description of the Background Art

U.S. Pat. No. 4,702,490, issued on Oct. 27, 1987, which has been assigned to the common owner to the present invention, discloses a typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as proportioning valve assembly, is disposed in the hydraulic circuit, which is connected to an electric or electronic control circuit which controls the valve position. The valve position of the pressure control valve is controlled by a suspension control signal produced in the control circuit for adjusting pressure in the working chamber and whereby controlling suspension characteristics.

On the other hand, European Patents 0 283 004, 0 285 153 and 0 284 053 disclose technologies for controlling the suspension systems constructed as set forth above, depending upon the vehicle driving condition for suppressing rolling and/or pitching of the vehicular body.

In the above-mentioned prior proposals, an electromagnetic actuator, e.g. solenoid, is employed in cooperation with the pressure control valve for controlling the valve position of the pressure control valve for adjusting delivery of working fluid to the hydraulic chamber in order to perform attitude change suppressive control, such as anti-rolling, anti-pitching, bouncing control and so forth, and to absorb vibration to be transmitted to the vehicular body. In such an active suspension system, substantially high response of the actuator is required in order to provide satisfactorily high response in adjustment of suspension characteristics depending upon the vehicle driving condition. For providing sufficiently high response to the electromagnetic actuator, there has been proposed to superimpose dither signal to a suspension control command for the actuator. Such a dither signal is effective to provide sufficiently high response to the actuator and thus successful in enhancement of response characteristics of the active suspension system.

However, superimposition of the dither signal may cause difficulty in detecting failure of the actuator. Namely, failure of the actuator may be detected by comparing a suspension control command value issued by a control unit with a driver current actually supplied to the actuator. In practice, the actually applied driver current cannot correspond to the suspension control command value due to inductance of the actuator. Furthermore, tolerance in elements forming the current feedback circuit may influence the driver current. Particularly, when the dither signal is superimposed on the suspension control command, tolerance or fluctuation of high frequency response characteristics of respective circuit elements becomes substantial. Therefore, in fail detection, a failure detection criterion to be compared with a difference or error between the suspension control command value and the actually applied driver current cannot be set at a satisfactorily small value. This leads to a lowering of the precision level in the detection of a failure.

In case of the active suspension system, even small error between the suspension control command value and the actually applied driver current may cause substantial degradation of the suspension control characteristics.

SUMMARY OF THE INVENTION

In view of the drawbacks in the prior art, it is an object of the present invention to provide a fail detection system for an electromagnetic actuator with satisfactorily high precision level in detecting failure and without causing degradation of responsive characteristics of the actuator.

In order to accomplish the aforementioned and other objects, a fail detecting system for an electromagnetic actuator, according to the present invention, avoids influence of a dither signal in the detection of failure of the electromagnetic actuator. Avoidance of influence of the dither signal is achieved by a performing comparison of a suspension control command with a driver current applied to the electromagnetic actuator in the absence of the dither signal. An error value between the suspension control command and the driver current obtained through this comparison is compared with a predetermined fault detecting criterion for judging a failure of the electromagnetic actuator when the error value is greater than the fault detecting criterion.

According to one aspect of the invention, an electromagnetic actuator driving system comprises a control signal source for providing a command signal having a value representative of an operational magnitude of the electromagnetic actuator, a dither signal source, associated with the command signal source, for superimposing a dither signal to the command signal, and a drive current supply means, responsive to the command signal having superimposed thereon the dither signal to supply a driver current to be supplied to the electromagnetic actuator, for driving the latter in a commanded magnitude. A fault checking means is active on the dither signal source, for making the latter ineffective for avoiding dither signal from the command signal supplied to the drive current supply means, for performing fail check operation to derive an error value between the command signal and the driver current, and compares the error value with a predetermined criterion to make judgement whether the electromagnetic actuator is operated in normal state.

The fault checking means may include a switching means variable of switch positions for selectively permitting and blocking superimposition of the dither signal to the command signal. The switching means is normally placed at a normal position to permit superimposition of the dither signal to the command signal and is responsive to initiation of fail checking operation to be switched into a fail check mode position for blocking the dither signal.

According to another aspect of the invention, an actively controlled suspension system comprises a hydraulic cylinder defining a working chamber disposed between a vehicle body and a suspension member rotatably supporting a vehicular wheel, a pressure source means including a pump means associated with an automotive internal combustion engine to be driven by the output of the engine, and a pressure control valve means. The pressure control valve means has a first port connected to the working chamber, a second port connected to the pressure source means via a supply line, and a third port connected to the pressure source means via a drain line. The pressure control valve means is variable of valve position for selectively establishing and blocking fluid communication between the first port and the second port and between the first port and the third port for adjusting fluid pressure in the working chamber for controlling suspension characteristics. The pressure control valve means incorporates an electromagnetic actuator for operating the pressure control valve means for selectively establishing and blocking fluid communications between the ports. A control signal source provides a command signal having a value representative of an operational magnitude of the electromagnetic actuator for operating the pressure control valve to one of a valve positions commanded by the command signal. A dither signal source, associated with the command signal source, superimposes a dither signal to the command signal. A drive current supply means, responsive to the command signal having superimposed thereon the dither signal to supply a driver current to be supplied to the electromagnetic actuator, drives the latter in a commanded magnitude. Fault checking means, active on the dither signal source, deactivate the drive current supply means to prevent the dither signal from the command signal from being supplied to the drive current supply means. The fault checking means performs a fail check operation to derive an error value between the command signal and the driver current and to compare the error value with a predetermined criterion to make judgement whether the electromagnetic actuator is operated in normal state.

The fault checking means is preferably active in response to ON set of power supply for a suspension control system.

BRIEF DESCRIPTION OF THE DRAWINGS

The present invention will be understood from the detailed description given herebelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
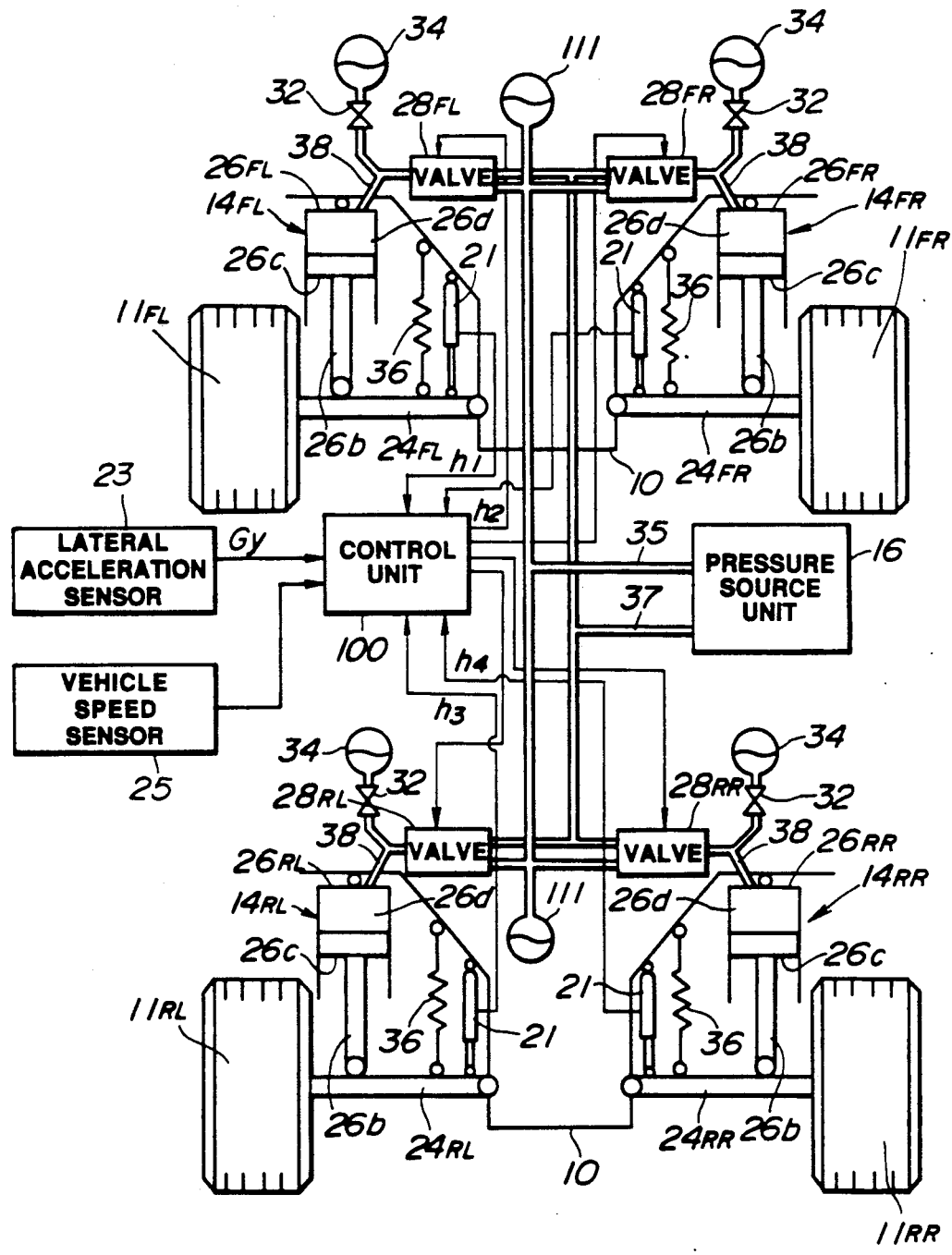
FIG. 1 is a diagrammatical illustration of the overall construction of the preferred embodiment of an active suspension system, according to the present invention, in which the preferred embodiment of a proportioning valve assembly is employed as a pressure control valve.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference number "24" as generally referred to. Similarly, the suspension mechanism as generally referred to will be hereafter represented by the reference numeral "14". Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinders 26 is disposed between the vehicular body 10 and respective suspension member 24 to produce a damping force for suppressing relative displacement between the vehicular body and the suspension member. The hydraulic cylinder 26 generally comprises an essentially enclosed cylindrical cylinder body 26a (FIG. 3) defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in a substantially restricted amount. The piston 26c is connected to the associated one of suspension member 24 via a piston rod 26b. A suspension coil spring 36 employed in the shown type of the suspension system is not required a resilient force in a magnitude required to provide in the ordinary suspension system and only is required to provide the resilient force necessary for maintaining the vehicular body about the suspension member.

The working chamber 26d of the hydraulic cylinder 26 is connected to one of the pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 27 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as proportioning solenoids. The actuators are connected to a microprocessor based control unit 100. The control unit 100 is connected a plurality of vehicular height sensors 21 which are disposed in respectively associated suspension mechanism and designed for monitoring relative position of the vehicular body 10 and the relevant suspension member 24 to produce vehicular height level indicative signals $h_1$, $h_2$, $h_3$ and $h_4$. The control unit 100 is also connected to a lateral acceleration sensor 23, a vehicle speed sensor 25 and so forth to receive the vehicle driving condition indicative parameters. Based on these control parameters, including the height level indicative signals, a lateral acceleration indicative signal $G_y$ generated by the lateral acceleration sensor 23a and so forth, the control unit performs anti-rolling, anti-pitching and bouncing suppressive suspension controls.

While the specific sensors, such as the vehicle height sensors which comprise strike sensor, the lateral acceleration sensor 23 and the vehicle speed sensor 25 are disclosed it is possible to replace or add any other sensors which monitor vehicle driving parameters associated with the suspension control. For instance, the stroke sensors 21 employed in the shown embodiment can be replaced with one or more vertical acceleration sensors. Similarly, the lateral acceleration sensor may be replaced with a steering angle sensor for monitoring steering behaviour for assuming the lateral force to be exerted on the vehicular body. In the later case, the parameter indicative of the steering angular displacement may be used in combination with vehicular speed data since vehicular speed may influence the rolling magnitude of the vehicle during a steering operation.

Figure 2:
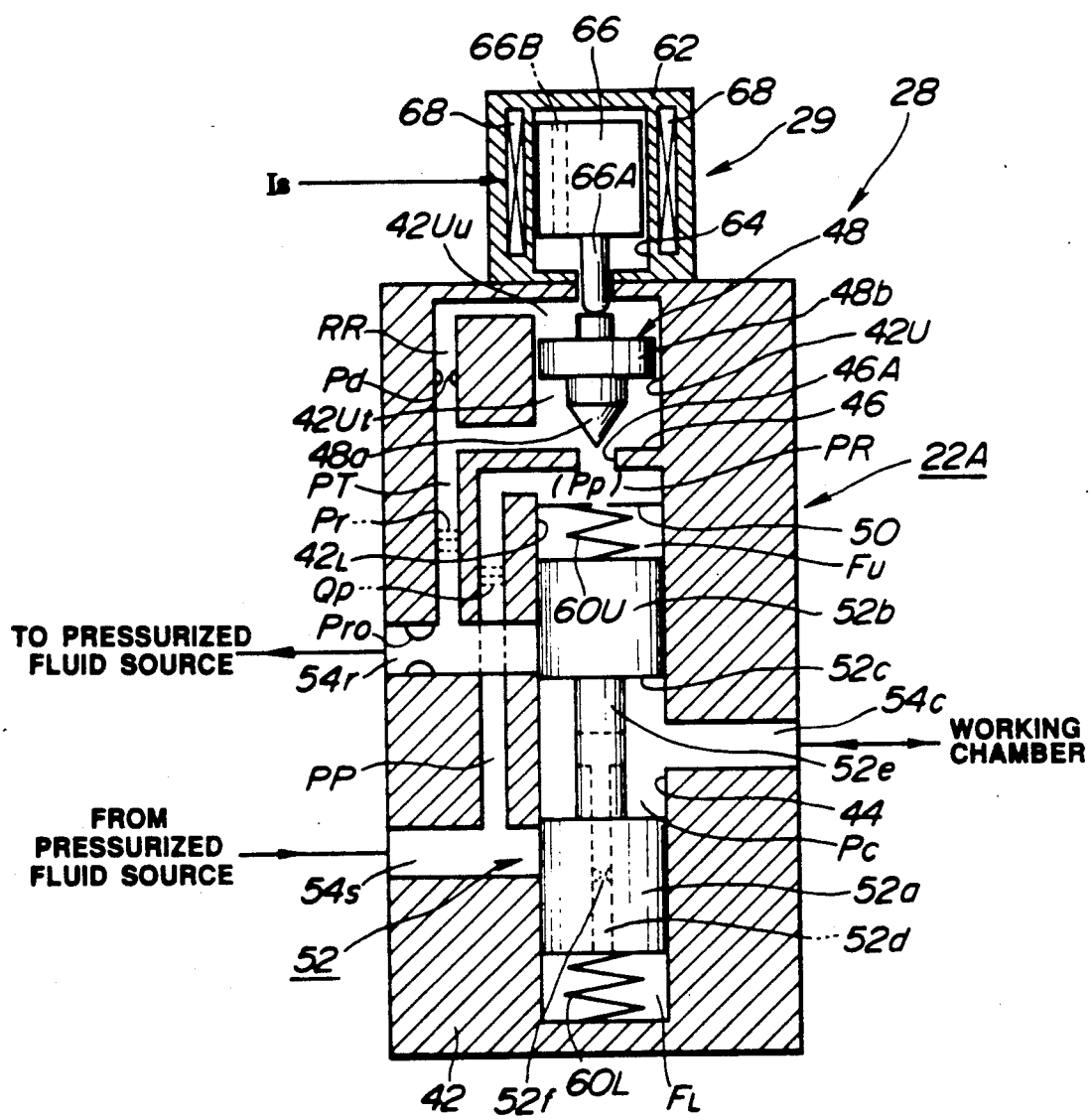
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 100 for varying the valve position according to variations of the current value of the control signal. Generally, the pressure control valve 28 controls the magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. The mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 cooperate to define a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exerts spring force to the valve spool 52 for resiliently restricting movement of the latter. Resilient forces of the offset springs 60U and 60L are so set as to balance the valve spool 52 to place it at a neutral position when the fluid pressure in the upper and flow feedback chambers FU and FL balance each other. The valve chamber 42L is communicated with a supply line 35 via a supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, the overall fluid pressure in the hydraulic circuit downstream of the pressure control valve, which circuit includes the working chamber 26d of the hydraulic cylinder 26, is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperates with the peripheral wall of the valve chamber 42L in order to define therebetween the pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a faces the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A, adjustments of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul communicate with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that the one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in the longitudinal direction, influence of the externally applied accelerations can be minimized.

Figure 3:
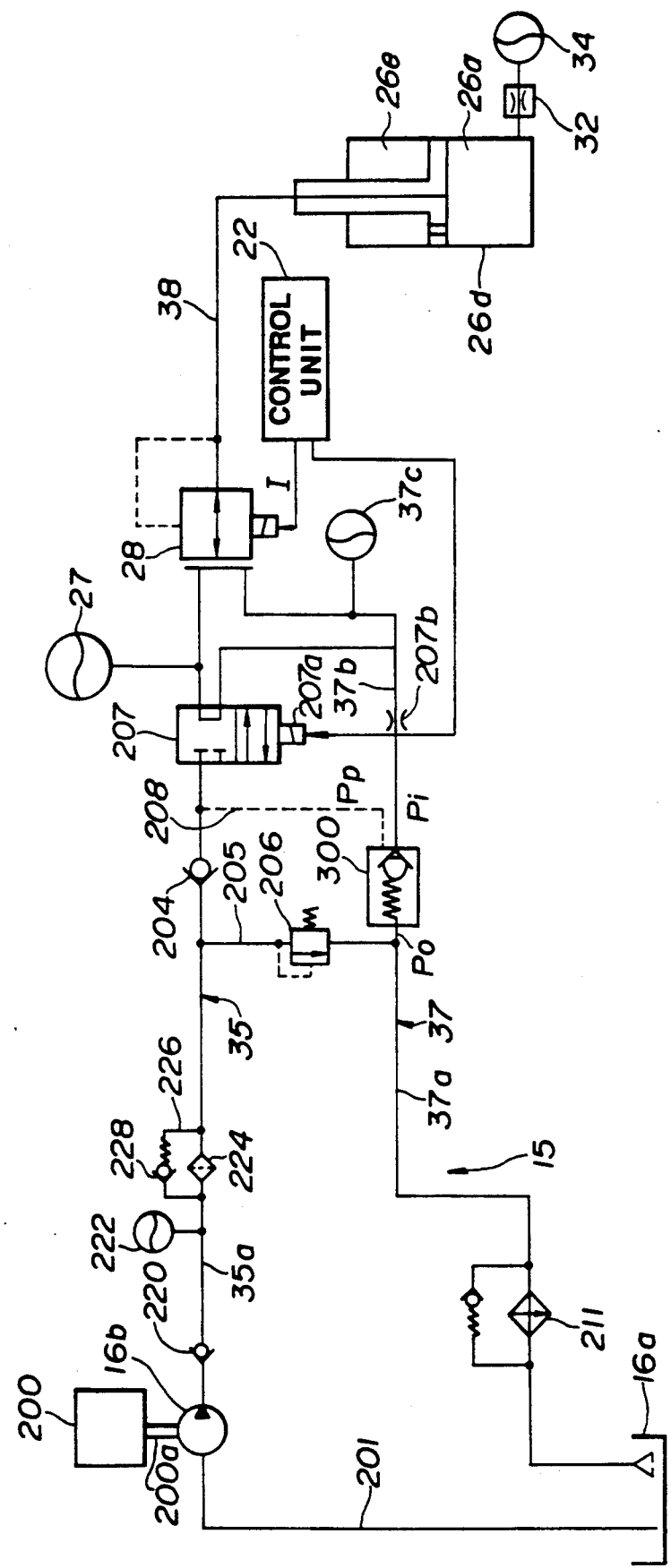
FIG. 3 is a circuit diagram of one example of a hydraulic circuit which is applicable for the active suspension system according to the present invention.

FIG. 3 shows detailed circuit construction of one example of hydraulic circuit which is applicable for the shown embodiment of the active suspension system, according to the present invention. The hydraulic circuit includes a fluid pressure source circuit 15 which includes the pressure source unit 16. The pressure source unit 16 includes a pressure unit 16b which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16b, through which the pressurized working fluid is discharged, is connected to the supply port 54s of the pressure control valve 28 via the supply line 35. A one-way check valve 220, a pressure accumulator 222 for absorbing pulsations, and a filter 224 are disposed in a portion 35a of the supply line 35. A by-pass passage 226 with a one-way check valve 228 is provided for by-passing the filter 224.

A pressure accumulator 27 is also connected to the supply line 35 to receive therefrom the pressurized fluid for accumulating the pressure. A one-way check valve 204 is disposed in a supply line 35 at the position upstream of the junction between the pressure accumulators 27 and the supply line 35.

The end of a pressure relief line 205 is also connected to the supply line 35 at a position intermediate between the filter 224 and the one-way check valve 204. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

On the other hand, an operational one-way check valve 300 is disposed between the sections 37a and 37b of the drain line 37. The operational one-way check valve 300 is also connected to the supply line 35 downstream of the one-way check valve 204 to receive therefrom the pressure in the supply line as a pilot pressure, via a pilot line 208. The operational one-way check valve 300 is designed to be maintained at an open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into a shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28.

For the section 37b of the drain line 37, a pressure accumulator 37c is provided. The pressure accumulator 37c is arranged for absorbing back pressure to be generated by flow resistance in the drain line 37.

An oil cooler 211 is disposed in the drain line 37 for cooling the working fluid returning to the reservoir tank 16a.

Figure 5:
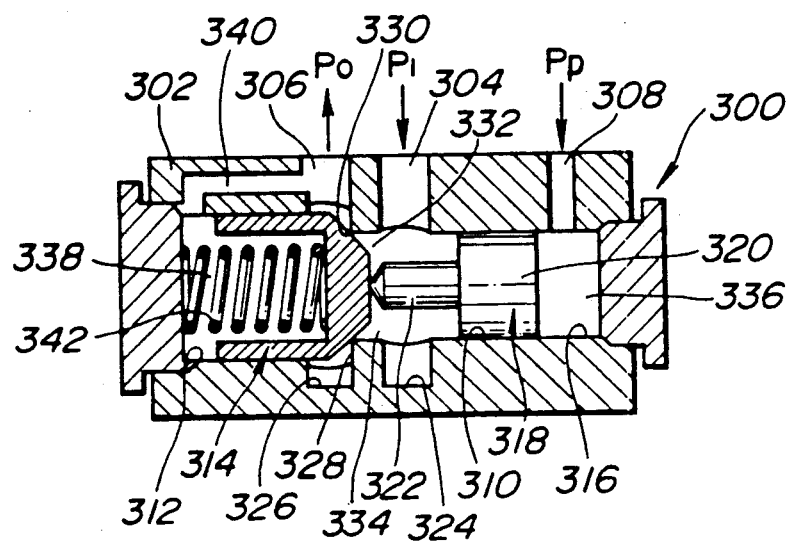
FIG. 5 is a sectional view of an operational one-way check valve employed in the preferred embodiment of the hydraulic circuit of the active suspension system of the invention.

FIG. 5 shows the detailed construction of the preferred embodiment of the operational one-way check valve 300 to be employed in the preferred embodiment of the active suspension system according to the present invention. As shown in FIG. 5, the operational one-way check valve 300 comprises a valve housing 302 formed with an inlet port 304, an outlet port 306 and a pilot port 308. The valve housing 302 defines a valve bore 310. The valve bore 310 comprises a larger diameter section 312, in which a poppet valve 314 is thrustingly disposed, and a smaller diameter section 316 in which a valve spool 318 is disposed. The pilot port 308 communicates with the supply line 35 at the section 35a disposed between the one-way check valve 204 and the pressure control valve unit 28FL 28FR, 28RL and 28RR, via the pilot line 300a. The pilot port 308 is, on the other hand, communicated with the smaller diameter section 316 to supply the line pressure of the supply line 35 at the orientation downstream of the one-way check valve 204 as the pilot pressure Pp. On the other hand, the inlet port 304 is communicated with the drain port 54r of the pressure control valve unit 28 via a section 37b of the drain line 37. The inlet port 304 communicates with the smaller diameter section 316 via an annular groove 324 formed on the inner periphery of the valve housing 302. The outlet port 306 is communicated with the fluid reservoir 16a via a section 37a of the drain line 37 and, in turn, is communicated with the larger diameter section 312 via an annular groove 326 formed on the inner periphery of the valve housing 302. As seen from FIG. 5, the annular grooves 324 and 326 are oriented in a side-by-side relationship, leaving a radially and inwardly projecting land 328. The land 328 has a shoulder 330.

The valve spool 318 and the poppet valve 314 cooperate with each other to define therebetween a control chamber 334 which communicates with the inlet port 304 and the outlet port 306. On the other hand, the valve spool 318 also defines a pilot chamber 336 at a side remote from the control chamber 334. The poppet valve 314 defines a pressure setting chamber 338 at a side remote from the control chamber 334. The pressure setting chamber 338 is communicated with the outlet port 306 via a path 340. A set spring 342 is disposed within the pressure setting chamber 338 for normally exerting a spring force to the poppet valve 314. In the preferred embodiment, the set spring 342 is provided a set force which corresponds to the neutral pressure $P_N$ of the pressure control valve unit 28.

The valve spool 318 has a valve body 320 and a valve stem 322 projecting from the valve body toward the poppet valve 314. The tip end of the valve stem 322 contacts with the mating surface of the poppet valve 314. The poppet valve 314 has an annular shoulder 332 mating with the shoulder of the land 330.

With the construction set forth above, the operational one-way check valve 300 operates as both the pressure relief valve for relieving the excessive pressure in the drain line and a one-way check valve. The relief pressure of the poppet valve 314 can be illustrated by the following balancing equation:

$$F_0 = P_{p0} \times A$$

where $F_0$ is the set pressure of the set spring 342;
A is an effective area of the spool; and
$P_{p0}$ is a relief pressure.

Here, assuming that the pressure Pi at the inlet port 304 is greater than or equal to the pilot pressure Pp at the pilot chamber 336, the valve spool 318 is shifted away from the poppet valve 314 so that the pilot pressure Pp in the pilot chamber 336 is not active on the valve position of the poppet valve. In such case, the poppet valve 314 operates purely as the pressure relief valve for relieving excessive pressure. At this time, the force balance as illustrated by:

$$Pi \times A = P_{p0} \times A$$

can be established. Therefore, as long as the fluid pressure at the inlet port 304 is higher than the relief pressure $P_{p0}$, the shoulder 332 of the poppet valve 314 is held away from the shoulder 330 of the land 328 so as to permit fluid flow through the outlet port 306 and the section 37a of the drain line 37 to the fluid reservoir 16a. On the other hand, when the pressure at the inlet port 304 is lower than or equal to the relief pressure $P_{p0}$, the spring force of the set spring 342 overcomes the fluid pressure to establish contact between the mating shoulders 332 and 330 to block fluid communication between the control chamber 334 and the outlet port 306.

On the other hand, when the pressure Pi at the inlet port 304 is lower than the pilot pressure $P_p$ in the pilot chamber 336, the valve spool 318 is shifted toward the poppet valve 314 to contact with the latter at the tip end of the valve stem 334. At this time, the force needed to depress the valve stem 334 onto the poppet valve 314 can be illustrated by $(P_p - Pi) \times A$. At this time, the pressure Pi introduced into the control chamber 334 via the inlet port 304 is canceled as an internal pressure. Therefore, the pressure balance at the poppet valve 314 can be illustrated by:

$$F_0 + kx = P_p \times A$$

where k is a spring coefficient of the set spring 342; and
x is a stroke of the poppet valve 314.

From the balancing equations give hereabove, the operational check valve 300 becomes open when the pilot pressure $P_p$ is higher than the relief pressure $P_{p0}$ and is held at shut-off position while the pilot pressure is held lower than the relief pressure.

A fail-safe valve 207 (FIG. 3) is provided in the supply line 35 and the drain line 37. The fail-safe valve, 207 is associated with a solenoid 207a for switching valve position between a normal mode position and a fail-safe mode position. The fail-safe valve 207 establishes fluid communication between the fluid source unit and the pressure control valve via the supply line 35 and the pressure control valve 28 and between the pressure control valve and the fluid reservoir 16a via drain line 37, in the normal mode. On the other hand, in the fail-safe mode, the fluid communication between the fluid source unit and the pressure control valve via the supply line 35 and the pressure control valve 28 and between the pressure control valve and the fluid reservoir 16a via drain line 37, are blocked. Instead, the inlet port of the pressure control valve 28 is directly connected to the drain line. In addition, a flow restriction orifice 207b is provided in the section 37b of the drain line 37. With the shown construction, the fluid pressure in the drain line is maintained higher than or equal to the neutral pressure by the operational check valve 300. The line pressure at the inlet port of the pressure control valve 28 can then be maintained at the neutral pressure or higher in the fail-safe mode.

In the hydraulic circuit set forth above, the fluid in pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and is introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and is thus returned to the reservoir tank 16a.

The fluid pressure in the supply line 35 is also fed to the operational one-way check valve 300 via a pilot line 208. As set forth, the operational one-way check valve 300 is placed at open position as long as the pilot pressure introduced through the pilot line 300a is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the operational one-way check valve 300 and the oil cooler 211.

The operational one-way check valve 300, even at the open position, serves as a resistance to the fluid flow. Therefore, the fluid pressure in the drain line 37 upstream of the operational one-way check valve 300 becomes higher, i.e. higher than the offset pressure $P_0$. Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to drop of the pressure in the supply line 35, the pilot pressure to be exerted to the operational one-way check valve 300 via the pilot line 300a drops. When the pressure in the pilot line 300a drops below or equal to the set pressure, the operational one-way check valve 300 is switched into its operational one-way check position to block fluid communication therethrough. As a result, the fluid pressure in the drain line 37 upstream of the operational one-way check valve 300 becomes equal to the pressure in the working chamber 26d. Therefore, even when the working fluid leaks through a gap between the spool valve 52 and the inner periphery of the valve bore, it does not affect the fluid pressure in the working chamber.

Figure 4:
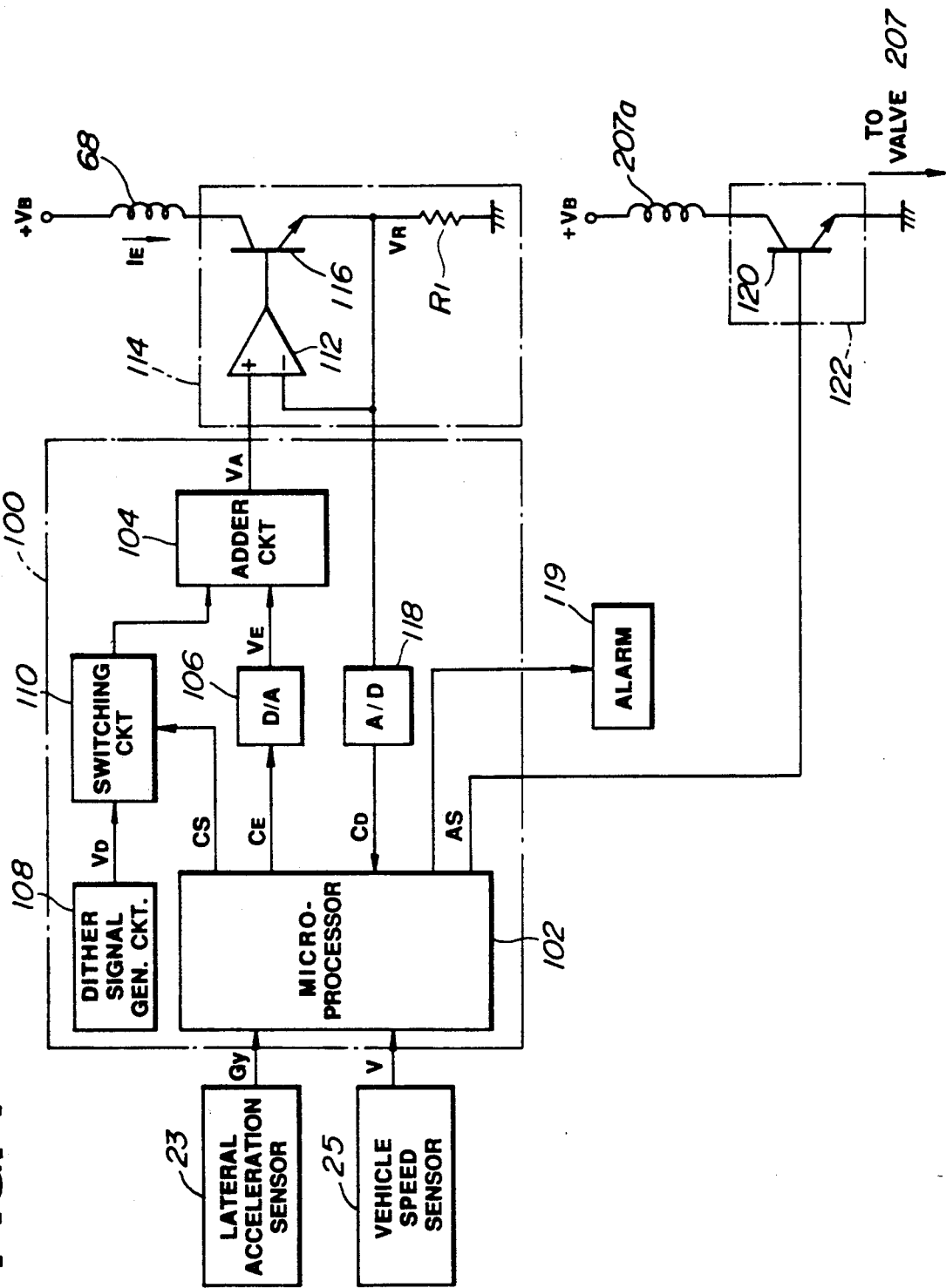
FIG. 4 is a block diagram of the preferred embodiment of a suspension control system associated with the shown embodiment of the active suspension system.

FIG. 4 schematically illustrates the preferred embodiment of a suspension control system for controlling the active suspension system of FIG. 1. As can be seen from FIG. 4, the control unit 100 includes a microprocessor 102 which receives the lateral acceleration indicative signal Gy and the vehicle speed indicative signal V to derive a suspension control command $C_E$. The suspension control command $C_E$ is fed to an adder circuit 104 via a digital-to-analog (D/A) converter 106 which converts digital form suspension control command to analog signal $V_E$. The adder circuit 104 is also connected to a dither signal generator circuit 108 via a switching circuit 110 which selectively establishes and blocks electrical communication between the dither signal generator circuit and the adder circuit. The switching circuit 110 is connected to the microprocessor 102 to receive therefrom a switching signal $C_S$ to alternate the switch position.

The adder circuit 104 is connected to a non-inverting input terminal of an operational amplifier 112 which forms a constant current circuit 114 together with a transistor 116. The constant current circuit 114 constitutes advice current supply means for driving actuator 207. The collector electrode of the transistor 116 is connected to a power source $+V_B$ via the solenoid coil 68 of the electromagnetic actuator 29. On the other hand, the emitter electrode of the transistor 116 is connected to the ground via a resistor $R_1$. The grounding circuit extending from the emitter electrode of the transistor is connected to an inverting input terminal of the operational amplifier for feeding back a signal $V_R$ which serves as "feedback signal". Also, the feedback $V_R$ is fed back to the microprocessor 102 via an analog-to-digital (A/D) converter 118 which converts the analog form feedback signal into digital driver current representative data. The microprocessor 102 is also connected to an alarm lamp 119 and a switching transistor 120 which is disposed in a grounding circuit of the solenoid 207a of the fail-safe valve 207. The transistor 120 forms a fail-safe circuit 122.

The microprocessor 102 performs various suspension control operations on the basis of various input parameters. Namely, the microprocessor 102 generally performs anti-rolling, anti-pitching control, bouncing suppressive control and so forth depending upon the vehicle driving condition as represented by various input parameters. The suspension control command $C_E$ to be generated by the microprocessor generally orders driver current varying between maximum and minimum values $I_{max}$ and $I_{min}$ according to the variation characteristics illustrated in FIG. 5.

Figure 6:
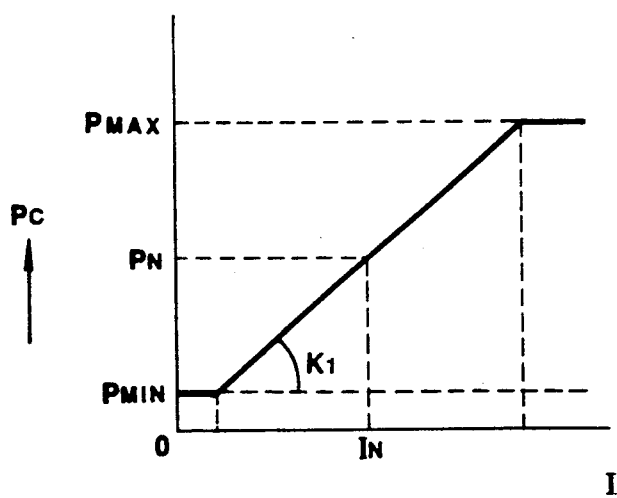
FIG. 6 is a chart showing the relationship between an electric current value of a control signal to be supplied for an actuator of the pressure control valve and a working fluid pressure supplied to a working chamber of a hydraulic cylinder.

FIG. 6 shows variation of the working fluid pressure in the working chamber 26d of the hydraulic cylinder 26 according to variations of the current value of the control signal applied to the actuator 29 of the pressure control valve 28. As seen from FIG. 6 the hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 6, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level as labeled $P_N$ represents neutral pressure at the neutral current $I_N$. As seen, the neutral current $I_N$ is set at an intermediate value between the maximum and minimum current values $I_{max}$ and $I_{min}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm².

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding the neutral value $I_N$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_P$ within the pilot chamber PR is maintained at the neutral pressure $P_N$. At this condition, if the fluid pressures is the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when relatively high frequency and small magnitude road shock is input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in a rebounding direction compressing the working chamber 26d, the fluid pressure in the working chamber increases to increase the control pressure Pc in the pressure control port 54c. Therefore, the control pressure Pc becomes higher than the pilot pressure Pp in the pilot chamber PR. This results in an increase of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes a pressure drop at the pressure control port 54c so that the control pressure Pc becomes lower than the pilot pressure Pp in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves to restrict fluid flow from the pressure control port 54c to the drain line 37. This flow restriction at the orifice Pro serves as a resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and returned through the pilot return path PT via the lower section 42Ul of the control chamber 42U and via the multi-stage orifice Pr. As long as the fluid flow in the pilot return path PT is not disturbed and thus steady. The most upstream side orifice Pr' is mainly effective for restricting the fluid flow. Therefore, the magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, and the fluid flowing through the pilot return path PT is disturbed and thus becomes unstable. This tends to cause serving a flow of the pressurized fluid from the drain port 54r to the pilot chamber PR. In such case, all of the orifices in the multi-stage orifice Pr is are effective to create greater flow restriction that than for the steady flow. This avoid influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress a rolling motion of the vehicular body, the fluid pressure in the working chamber 26d of the hydraulic cylinder 26 which is provided for the suspension mechanism at the side where the vehicular height is lowered across the neutral position, is increased to suppress the lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress the rising motion of the vehicle body. Therefore, in order to control the pressures in the working chambers 26d of the both side hydraulic cylinders 26, control signal current values are increased and creased across the neutral value $I_N$.

For example, when rolling motion is caused by a left turn of the vehicle, the control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 28 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By varying the positions of the poppet valves 48, the flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Figure 7:
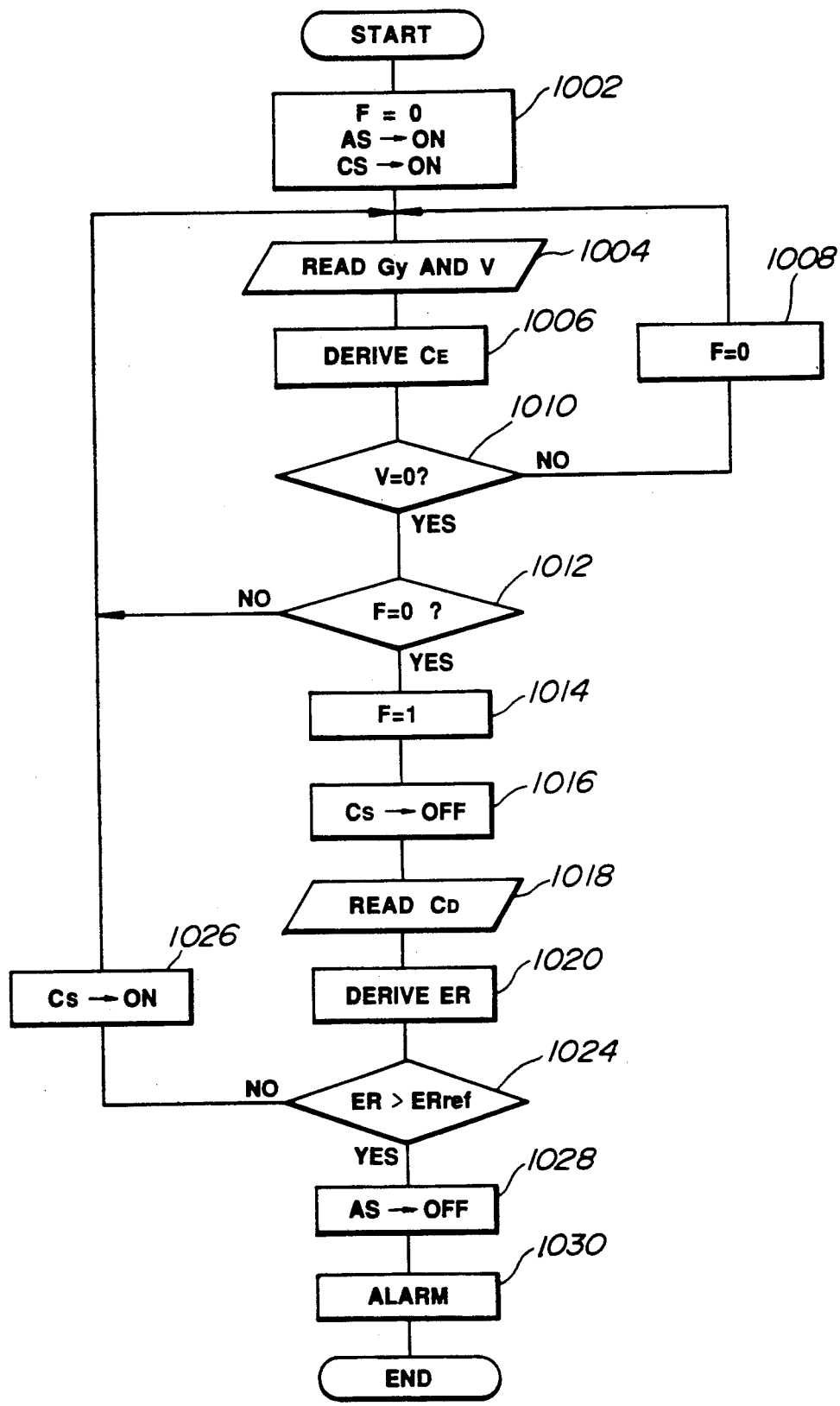
FIG. 7 is a flowchart showing a routine for detecting failure of an electromagnetic actuator.

FIG. 7 shows a process of fail detection for detecting failure of the electromagnetic actuator 29. In general, the fail detection is performed by comparing the suspension control command value $C_E$ with the driver current indicative data $C_D$ to derive an error ER. The error ER is compared with a predetermined faulty driver current criterion for checking whether the electromagnetic actuator 29 operates in normal state or not.

It should be noted that the shown process of fail detection is performed at ON-set of power supply. Practically, the shown routine is triggered in response to turning ON of the ignition switch to perform a fail check.

At an initial stage after execution, initialization of the system is performed to reset a control flag F, at a step 1002. At the same time, at the step 1002, a fault detection signal AS is set ON to represent normal state of the electromagnetic actuator 29, and the switching signal $C_S$ is set ON to place the switching circuit 110 at the normal state position. In response to setting ON of the fault detection signal AS, the switching transistor 120 in the fail-safe circuit 122 becomes conductive to energize the solenoid 207a of the fail-safe valve 207, which is placed at normal mode position. Thereafter, at a step 1004, the input data, e.g. lateral acceleration indicative data Gy and the vehicle speed indicative data V are, are read out. Subsequently, on the basis of the input data, the suspension control command value $C_E$ is derived at a step 1006.

At a step 1010, check is performed whether the vehicle speed indicative data V represents substantially zero speed of the vehicle. If the vehicle speed is not zero as checked at the step 1010, the control flag F is reset at a step 1008. After resetting the control flag F, the process returns to the step 1004. On the other hand, if the vehicle speed as checked at a step 1008 is zero, a check is performed whether the control flag F is in reset state at a step 1012. If the answer at the step 1012 is negative, the process returns to the step 1004 to perform normal state suspension control through the steps 1004 and 1006. On the other hand, when the control flag F is in the reset state, control flag F is set at a step 1014, the switching signal $C_S$ is turned OFF to disconnect the dither signal generator circuit 108 from the adder circuit 104, at a step 1016. As a result, supply of the dither signal to the adder circuit 104 is terminated so that the adder output precisely corresponds to the suspension control command $C_E$. Then, the driver current indicative data $C_D$ is read out at a step 1018. The error value ER between the suspension control command value $C_E$ and the driver current indicative data $C_D$ is then derived at a step 1020. The error value ER is compared with a fault detection criterion $ER_{ref}$ which represents allowable maximum error between the suspension control command value $C_E$ and the driver current indicative data $C_D$, at a step 1022. If the error value ER is smaller than or equal to the fault detection criterion $ER_{ref}$ as checked at the step 1024, the switching signal $C_S$ is switched ON at a step 1024, and then process returns to the step 1004. When the error value ER is greater than the fault detection criterion $ER_{ref}$ as checked at the step 1024, then, the fault detection signal AS in turned OFF to show the faulty state of the electromagnetic actuator, at a step 1028. Subsequently, the alarm lamp 119 is turned ON to indicate the faulty state of the electromagnetic actuator at a step 1030.

When the fault detection signal AS is turned OFF at the step 1028, the switching transistor 120 is turned OFF to deenergize the solenoid 207a of the fail-safe valve 207. As a result, the fail-safe valve position is switched from the normal mode position to the fail-safe mode position.

Figure 8:
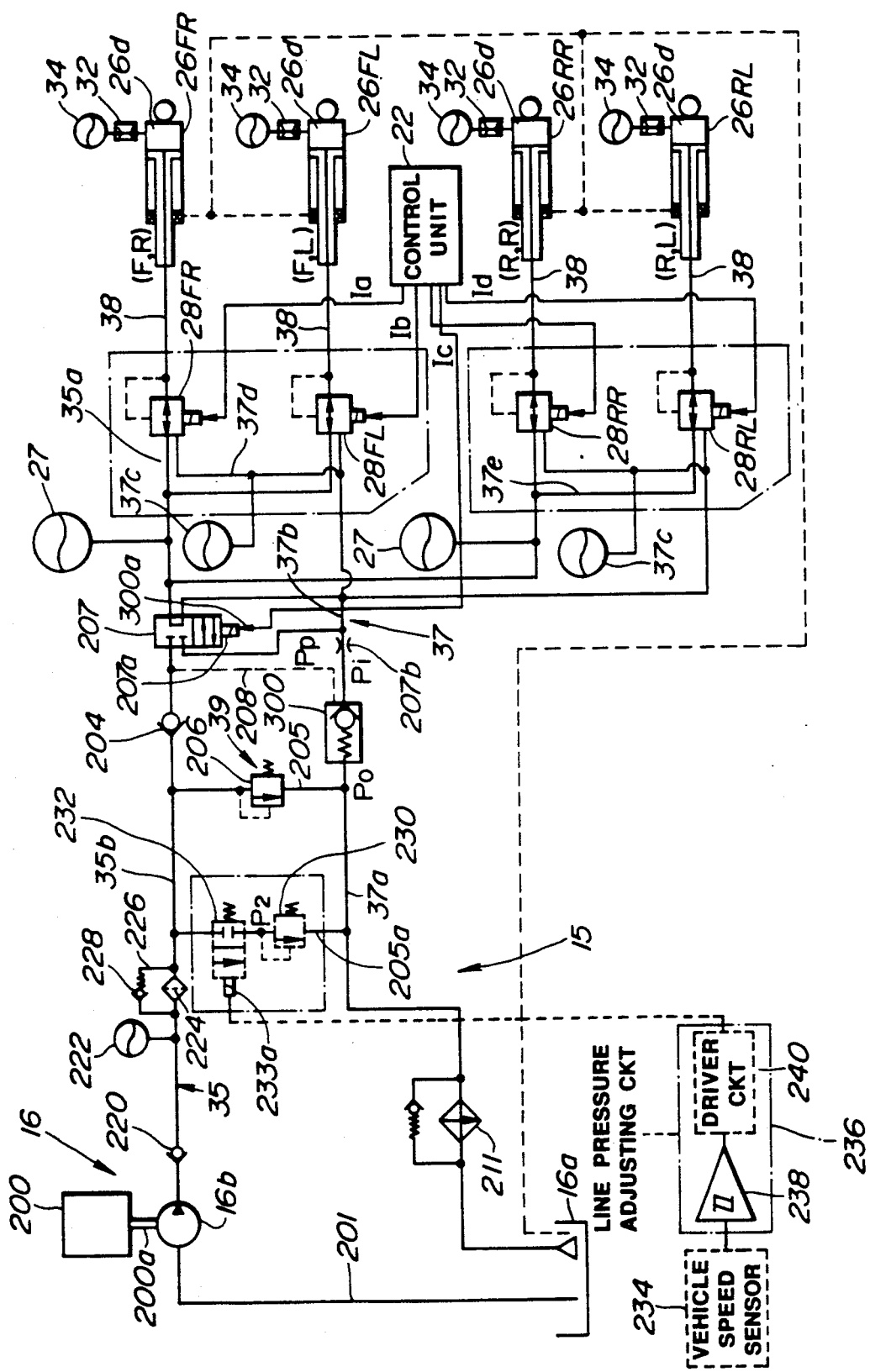
FIG. 8 is a circuit diagram of a modified hydraulic circuit in the active suspension system.

FIG. 8 shows a modification of the hydraulic circuit which is also applicable for the shown embodiment of the active suspension system, according to the present invention. Similarly to the foregoing circuit in FIG. 3, the hydraulic circuit includes a fluid pressure source circuit 15 which includes the pressure source unit 16. The pressure source unit 16 includes the pressure unit 16b which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16b, through which the pressurized working fluid is discharged, is connected to the supply ports 54s of the pressure control valves 28FL, 28FR, 28RL and 28RR respectively associated with the hydraulic cylinders 26FL, 26FR, 26RL and 26RR, via the supply line 35. A one-way check valve 220, a pressure accumulator 222, for absorbing pulsation, and a filter 224 are disposed in a portion 35b of the supply line 35. A by-pass passage 226 with an one-way check valve 228 is provided for by-passing the filter 224. The supply line 35 has branch lines 35a respectively connected to the supply ports 54s of respectively corresponding pressure control valves 28FL, 28FR, 28RL and 28RR.

A high pressure accumulator 27 is also connected to the supply line 35 to receive therefrom the pressurized fluid for accumulating the pressure, which accumulator has large capacity and high set pressure, e.g. several tens kg/cm². A one-way check valve 204 is disposed in the supply line 35 at the position upstream of the junction between the high pressure accumulators 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

It should be noted that if desired, line pressure can be adjusted depending upon preselected vehicle driving parameter such as a vehicle speed. In case the vehicle speed dependent variable line pressure is desired, another pressure relief valve 230 may be provided in parallel to the pressure relief valve 206 as shown by broken line in FIG. 8. The pressure relief valve 230 is disposed in an additional pressure relief line 205a which extends parallel to the pressure relief line 205 and is thus connected to the section 35a of the supply line 35 in the fluid pressure source circuit 15 at the upstream end and to the section 37a of the drain line 37 in the fluid pressure source circuit at the downstream end. An electromagnetic shut-off valve 232 is also provided in the pressure relief line 205a at an orientation upstream of the pressure relief valve 230. The pressure relief valve 205a is provided with a lower set pressure than that of the pressure relief valve 206 so as to adjust the line pressure in the supply line 35 at a second line pressure level which is lower than the first line pressure level.

The electromagnetic shut-off valve 232 has an electromagnetic solenoid 233a connected to a line pressure adjusting circuit 236 so that it may be operated in response to a line pressure control signal from the latter to switch valve position between an open position to establish fluid communication between the supply line 35 and the pressure relief valve 230 and a closed position to block fluid communication therebetween. The line pressure adjusting circuit 236 comprises a Schmitt trigger circuit 238 and a driver circuit 240. The Schmitt trigger circuit 238 is connected to a vehicle speed sensor 234 which monitors vehicle speed to produce a vehicle traveling speed to produce a vehicle speed indicative signal V. The Schmitt trigger circuit 238 is designed to respond to a vehicle speed indicative signal value greater than a preset speed to output a HIGH level signal and a output a LOW level signal otherwise. The driver circuit 240 is so designed as to output a driver current to the solenoid 233a of the electromagnetic shut-off valve 232 for energizing the solenoid to place the shut-off valve at an open position when the output of the Schmitt trigger circuit 238 is held at a LOW level. The preset speed of the Schmitt trigger circuit 238 represents substantially a low vehicle speed where adjustment of the fluid pressure in the working chamber 26d of the hydraulic cylinder 26 is not required.

Therefore, while the vehicle is not running or is traveling at substantially low speed lower than the set speed, the pressure relief valve 230 becomes active to relieve the pressure in excess of the second relief pressure. Therefore, the line pressure in the supply line 35 is lowered to reduce the load on the engine for driving the fluid pump 16a can be reduced.

On the other hand, an operational one-way check valve 300 is disposed between sections 37a and 37b of the drain line 37. The section 37b of the drain line 37 forms two branches. As can be seen from FIG. 8, the drain ports 54r of the pressure control valves 28Fl and 28FR are connected to one of the branch of the section 37b via a communication lines 37d. For the communication line 37d, a low pressure accumulator 37c which has a smaller capacity than the accumulator 27 and a lower set pressure, e.g. several kg/cm², is connected. On the other hand, the drain ports 54r of the pressure control valves 28RL and 28RR are connected to one of the branch of the section 37b via a communication lines 37e. For the communication line 37e, a low pressure accumulator 37c is connected. The operational one-way check valve 300 is also connected to the supply line 35 downstream of the one-way check valve 204 to receive therefrom the pressure in the supply line as a pilot pressure, via a pilot line 208. The operational one-way check valve 300 is designed to be maintained at its open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28.

An oil cooler 211 is disposed in the drain line 37 for cooling the working fluid returning to the reservoir tank 16a.

In the shown construction, piping for drain line can be simplified by commonly using the sections 37b. Also, by providing the low pressure accumulator in the communication lines 37d and 37e, back pressure in the drain line can be successfully absorbed. Also, the pressure accumulators 37c are also active for absorbing interfering pressure between two pressure control valves commonly connected to single drain line 37b.

In the hydraulic circuit of FIG. 8, the fail-safe valve 207 with the solenoid 207a and the flow restriction orifice 207b are provided for performing substantially the identical operation to that doen in the circuit of FIG. 3.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, the active suspension system can be constructed in various fashions and control of the active suspension can be done in various manners. For example, reference is made to the following co-pending application, publication and patents.

U.S. patent application Ser. No. 052,934, filed on May 22, 1989, which has now been issued as U.S. Pat. No. 4,903,983, on Feb. 27, 1990:

U.S. patent application Ser. No. 059,888, filed on June 9, 1987, corresponding European Patent Application has been published as First Publication No. 02 49 209:

U.S. patent application Ser. No. 060,856, filed on June 12, 1987, corresponding European Patent Application has been published as First Publication No. 02 49 227:

U.S. patent application Ser. No. 060,909, now U.S. Pat. No. 4,909,534 filed on June 12, 1987:

U.S. patent application Ser. No. 060,911, filed on June 12, 1987, which has now been issued as U.S. Pat. No. 4,801,115, on Jan. 31, 1989:

U.S. patent application Ser. No. 176,246, filed on Mar. 31, 1988, now U.S. Pat. No. 4,938,499, the corresponding European Patent Application has been published as First Publication No. 02 85 153:

U.S. patent application Ser. No. 178,066, filed on Apr. 5, 1988, which has now been issued as U.S. Pat. No. 4,848,790, on July 18, 1989, and the corresponding European Patent Application has been published as First Publication No. 02 86 072:

U.S. patent application Ser. No. 167,835, filed on Mar. 4, 1988, which has now been issued as U.S. Pat. No. 4,865,348, on Sept. 12, 1989:

U.S. patent application Ser. No. 244,008, filed on Sept. 14, 1988, now U.S. Pat. No. 4,888,696:

U.S. patent application Ser. No. 255,560, filed on Oct. 11, 1988, now U.S. Pat. No. 4,943,084:

U.S. patent application Ser. No. 266,763, filed on Nov. 3, 1988, now U.S. Pat. No. 4,967,360, corresponding European Patent Application has been published under First Publication No. 03 18 721:

U.S. patent application Ser. No. 261,870, filed on Oct. 25, 1988:

U.S. patent application Ser. No. 263,764, filed on Oct. 28, 1988, now U.S. Pat. No. 4,905,152, corresponding European Patent Application has been published under First Publication No. 03 14 164:

U.S. patent application Ser. No. 277,376, filed on Nov. 29, 1988, now U.S. Pat. No. 4,919,440, corresponding European Patent Application has been published under First Publication No. 03 18 932:

U.S. patent application Ser. No. 303,338, filed on Jan. 26, 1989, corresponding German Patent Application has been published under First Publication No. 39 02 312:

U.S. patent application Ser. No. 302,252, filed on Jan. 27, 1989:

U.S. patent application Ser. No. 310,130, filed on Mar. 22, 1989, now U.S. Pat. No. 4,973,079, corresponding German Patent Application has been published under First Publication No. 39 04 922:

U.S. patent application Ser. No. 327,460, filed on Mar. 22, 1989, now U.S. Pat. No. 4,911,469, corresponding German Patent Application has been published under First Publication No. 39 10 030:

U.S. patent application Ser. No. 303,339, filed on Jan. 26, 1989, now U.S. Pat. No. 4,948,165:

U.S. patent application Ser. No. 331,602, filed on Mar. 31, 1989:

U.S. patent application Ser. No. 331,653, now U.S. Pat. No. 4,911,468, filed Mar. 31, 1989, corresponding German Patent Application has been published under First Publication No. 39 10 445:

U.S. patent application Ser. No. 364,477, filed on June 12, 1989, corresponding European Patent Application has been published under First Publication No. 03 45 816:

U.S. patent application Ser. No. 365,468, filed on June 12, 1989, corresponding European Patent Application has been published under First Publication No. 03 45 817:

U.S. patent application Ser. No. 422,813, filed on Oct. 18, 1989, now U.S. Pat. No. 4,961,595:

U.S. patent application Ser. No. 454,785, filed on Dec. 26, 1989, now U.S. Pat. No. 4,982,979:

The disclosures of the hereabove listed prior applications, publications and patents are herein incorporated by reference. Furthermore, any two or more prior proposed inventions may be combined in practical implementation of an active suspension system. Therefore, any combination of the above mentioned prior proposed inventions are to be deemed as disclosed due to incorporation by reference as a part of the present invention.

What is claimed is:

1. An electromagnetic actuator driving system comprising:

a control signal source for providing a command signal having a value representative of an operational magnitude of said electromagnetic actuator;

a dither signal source, associated with said command signal source, for superimposing a dither signal to said command signal;

a drive current supply means, responsive to said command signal having said dither signal superimposed thereon to supply a driver current to be supplied to said electromagnetic actuator, for driving said electromagnetic actuator in a commanded magnitude;

fault checking means, active on said dither signal source, for deactivating said dither signal source, thereby preventing the supply of said dither signal from the command signal to said drive current supply means, for performing a fail check operation to derive an error value between said command signal and said driver current and to compare said error value with a predetermined criterion to determine whether said electromagnetic actuator is operated in a normal state.

2. An electromagnetic actuator driving system as set forth in claim 1, wherein said fault checking means includes a switching means, variable of switch positions, for selectively permitting and blocking superimposition of said dither signal to said command signal, said switching means being normally placed at a normal position to permit superimposition of said dither signal to said command signal and being responsive to an initiation of a fail checking operation to be switched into a fail check mode position for blocking said dither signal.

3. An actively controlled suspension system comprising:

a hydraulic cylinder disposed between a vehicle body and a suspension member rotatably supporting a vehicular wheel, said hydraulic cylinder defining therein a working chamber;

a pressure source means including a pump means associated with an automotive internal combustion engine to be driven by the output of said engine;

a pressure control valve means, having a first port connected to said working chamber, a second port connected to said pressure source means via a supply line, and a third port connected to said pressure source means via a drain line, said pressure control valve means being variable of valve position for selectively establishing and blocking fluid communication between said first port and said second port and between said first port and said third port, for adjusting fluid pressure in said working chamber for controlling suspension characteristics, said pressure control valve means incorporating an electromagnetic actuator for operating said pressure control valve means for selectively establishing and blocking fluid communications between said ports; and a control signal source for providing a command signal having a value representative of an operational magnitude of said electromagnetic actuator for operating said pressure control valve to one of the valve positions commanded by said command signal;

a dither signal source, associated with said command signal source, for superimposing a dither signal to said command signal;

a drive current supply means, responsive to said command signal having said dither signal superimposed thereon to supply a driver current to be supplied to said electromagnetic actuator, for driving said electromagnetic actuator in a commanded magnitude;

fault checking means, active on said dither signal source, for deactivating said dither source, thereby preventing the supply of said dither signal from the command signal to said drive current supply means, for performing a fail check operation to derive an error value between said command signal and said driver current and to compare said error value with a predetermined criterion to determine whether said electromagnetic actuator is operated in a normal state.

4. An electromagnetic actuator driving system as set forth in claim 3, wherein said fault checking means includes a switching means, variable of switch positions, for selectively permitting and blocking superimposition of said dither signal to said command signal, said switching means being normally placed at a normal position to permit superimposition of said dither signal to said command signal and responsive to an initiation of a fail checking operation to be switched into a fail check mode position for blocking said dither signal.

5. An active suspension system as set forth in claim 3, wherein said fault checking means is active in response to an ON set of a power supply for a suspension control system.

* * * * *